United States Patent [19]
Handke et al.

[11] Patent Number: 6,126,198
[45] Date of Patent: Oct. 3, 2000

[54] SPRING STRUT WITH STEERING KNUCKLE

[75] Inventors: Günther Handke, Euerbach; Frank von den Bergen, Hei denfeld, both of Germany

[73] Assignee: Mannesmann Sachs AG, Schweinfurt, Germany

[21] Appl. No.: 09/099,071

[22] Filed: Jun. 17, 1998

[30] Foreign Application Priority Data

Jun. 18, 1997 [DE] Germany ............ 197 25 715

[51] Int. Cl.⁷ .................................. B60G 7/00
[52] U.S. Cl. ........................ 280/776; 280/124.145
[58] Field of Search ............ 280/FOR 124.145, 280/FOR 124.146, FOR 124.197, 86.752

[56] References Cited

U.S. PATENT DOCUMENTS

| | | | |
|---|---|---|---|
| 3,941,401 | 3/1976 | Allison | 280/96.2 |
| 4,321,988 | 3/1982 | Bich | 188/322.11 |
| 4,653,773 | 3/1987 | Graft | 280/673 |
| 5,772,168 | 6/1998 | Nakazawa et al. | 248/300 |

FOREIGN PATENT DOCUMENTS 82 32 408   3/1983   Germany .

*Primary Examiner*—Lanna Mai
*Assistant Examiner*—Kevin McKinley
*Attorney, Agent, or Firm*—Cohen, Pontani, Lieberman & Pavane

[57] ABSTRACT

A spring strut with a steering knuckle, the spring strut having a tubular body to which the steering knuckle is fastened by a screw connection. The steering knuckle has a continuous slot which, together with the fastener, forms a clamping connection between the tubular body and the steering knuckle. A positioning connection, including a recess and an engagement part, exactly aligns the tubular body and steering knuckle with one another in the circumferential direction.

7 Claims, 4 Drawing Sheets

SPRING STRUT WITH STEERING KNUCKLE

BACKGROUND OF THE INVENTION

1. Field of the Invention

The present invention is directed to a spring strut with a steering knuckle, and in particular a spring strut having a tubular body to which the steering knuckle is fastened by a screw connection. The steering knuckle has a continuous slot which, together with a fastening screw, establishes a clamping connection for attaching the steering knuckle to the tubular body.

2. Description of the Related Art

The German Utility Model G 82 32 408 U1 describes a spring strut with a steering knuckle. The clamping connection may be satisfactory with respect to transmission of force, however, assembly is difficult to automate because, under some circumstances, the fastening screw can only be successfully inserted after repeated attempts. Therefore, manual assembly becomes unavoidable.

SUMMARY OF THE INVENTION

It is an object of the present invention to provide a spring strut with a steering knuckle that overcomes the problem of the prior art described above.

According to the present invention, this object is accomplished by advantageously establishing a positioning connection between the tubular body and the steering knuckle, so that there is an exact correspondence of the structural component parts forming the clamping connection in the circumferential direction. Because only two structural component parts need to be moved it is simple to automatically engage the positioning connection. A robot may be used to move the tubular body and the steering knuckle axially relative to one another and in the circumferential direction. As soon as the positioning connection is engaged, a sudden increase in force can be determined for the relative movements by way of a sensor arrangement. The sensed increase in force indicates a very high probability that the assembly position for a fastening means is properly engaged.

A further substantial advantage of the present invention is that, should the clamping connection weaken, the positioning connection ensures a transmission of force in the circumferential direction.

In another advantageous embodiment of the present invention, the positioning connection comprises an engagement part and a recess, the engagement part and the recess being constructed at the outer surface of the two structural component parts. Not every manufacturing plant is equipped with modern assembly robots. However, manual positioning of the steering knuckle relative to the tubular body is often cumbersome. Since both parts of the positioning connection of the present invention are constructed at the outer surface, a person performing the assembly can easily move the two parts into proper alignment thereby enabling the insertion of the fastening means in a sure and deliberate manner.

The recess is simply formed by the clamping connection slot. Additional costs for manufacture of the positioning connection are minimized as at least one part of the positioning connection can be realized without cost.

The engagement part of the positioning connection is formed by a radially projecting pin or bolt attached to the tubular body. Standard bolts can advantageously be used so as to simplify manufacturing and reduce costs. Further, the bolt serves as a reference point for other add-on parts such as a spring disk or a stabilizer holder.

In accordance with a further feature of the present invention, the bolt is welded to the tubular body. Resistance welding is used as a welding process so that there is no weld seam bulge which would render insertion of the bolt into the slot of the clamping connection more difficult if not impossible.

The bolt has a substantially T-shaped cross section, creating a large contact surface which advantageously enables a high transmission of force. In a further advantageous embodiment of the present invention, the tubular body has a pocket having a depth at least as great as the bolt head thickness. This prevents the head of the bolt from engaging the slot of the clamping connection.

In another embodiment of the present invention the tubular body has a stop which positions the steering knuckle along the longitudinal axis of the spring strut. Given the availability of corresponding devices, the positioning along the longitudinal axis follows from the configuration of the device. In the case of robot-assisted assembly, a path measurement can be performed to longitudinally position the steering knuckle. If manufacture is to be carried out entirely manually, however, the stop determines the exact installation position. Of course, the stop can also be useful for automated assembly, since path measurement can be dispensed with.

An additional fail safe measure is provided by the present invention. In the most unfavorable case, if the entire clamping connection becomes disengaged, the positioning connection of the present invention would prevent an uncontrolled wheel suspension movement.

When a bolt is used as part of a positioning connection, it is very advisable for the stop to be formed by another bolt. The use of bolts provides further advantages. For example, at least one of the bolts can have a threaded portion which forms a positive connection with another structural component part, especially with a brake hose retainer. The additional structural component part can be pressed onto the bolt in a simple manner, enabling the additional structural component part to be made of plastic.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

FIG. 2b is a detailed view taken along arrow 2b of FIG. 2a;

FIG. 4b is a detailed view of the encircled portion 4b of FIG. 4a.

DETAILED DESCRIPTION OF THE PRESENTLY PREFERRED EMBODIMENTS

Figure 1:
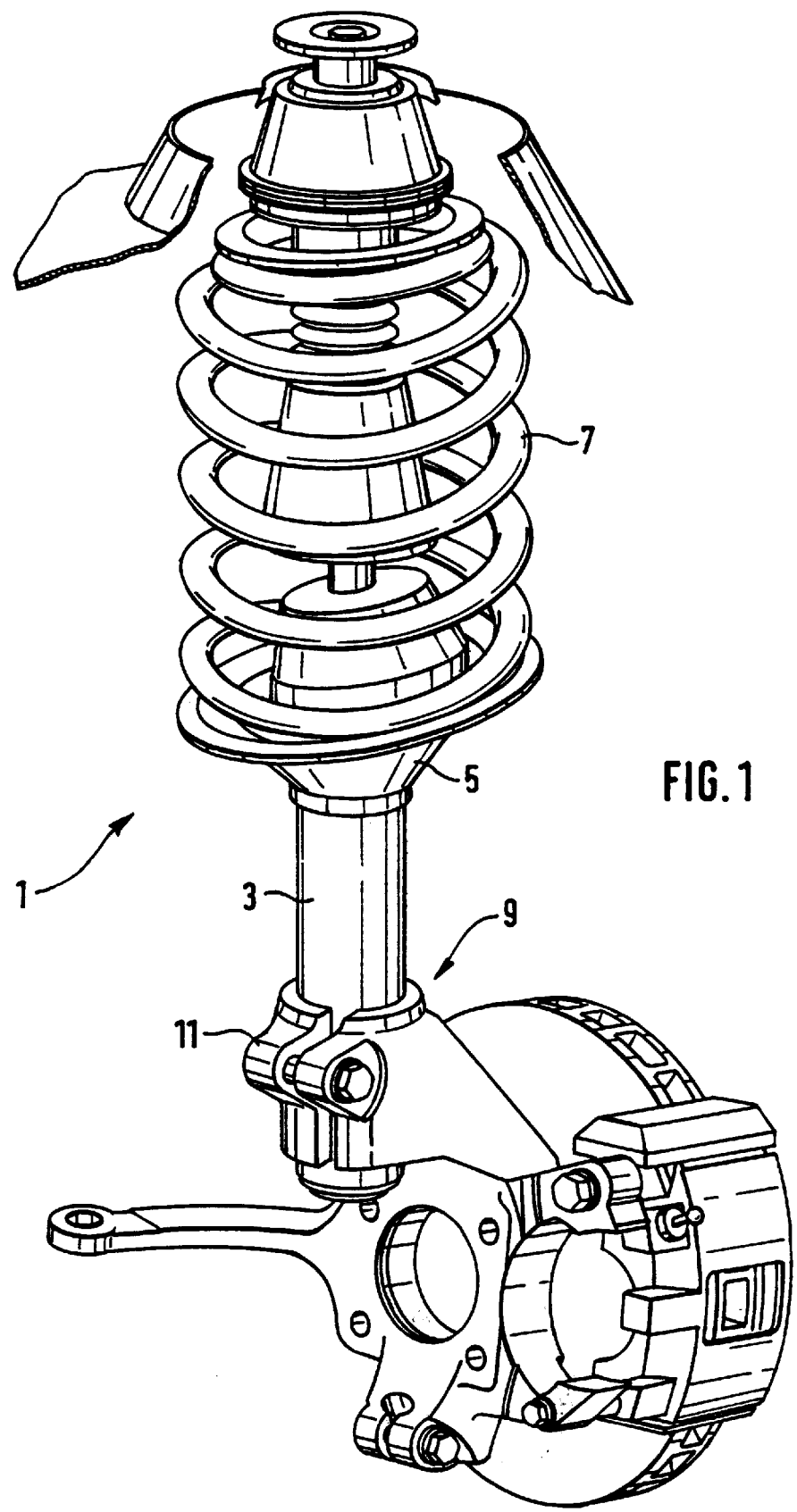
FIG. 1 is a perspective view of the spring strut and steering knuckle assembly of the present invention.

FIG. 1 shows a spring strut 1 such as is used in compact motor vehicles. The spring strut 1 has a spring disk 5 which is attached, typically by welding, to a tubular body 3. A vehicle suspension spring 7 is supported by the spring disk 5. A clamping connection 11 is used to fasten a steering knuckle 9 to a lower end of the tubular body 3.

Figure 2A:
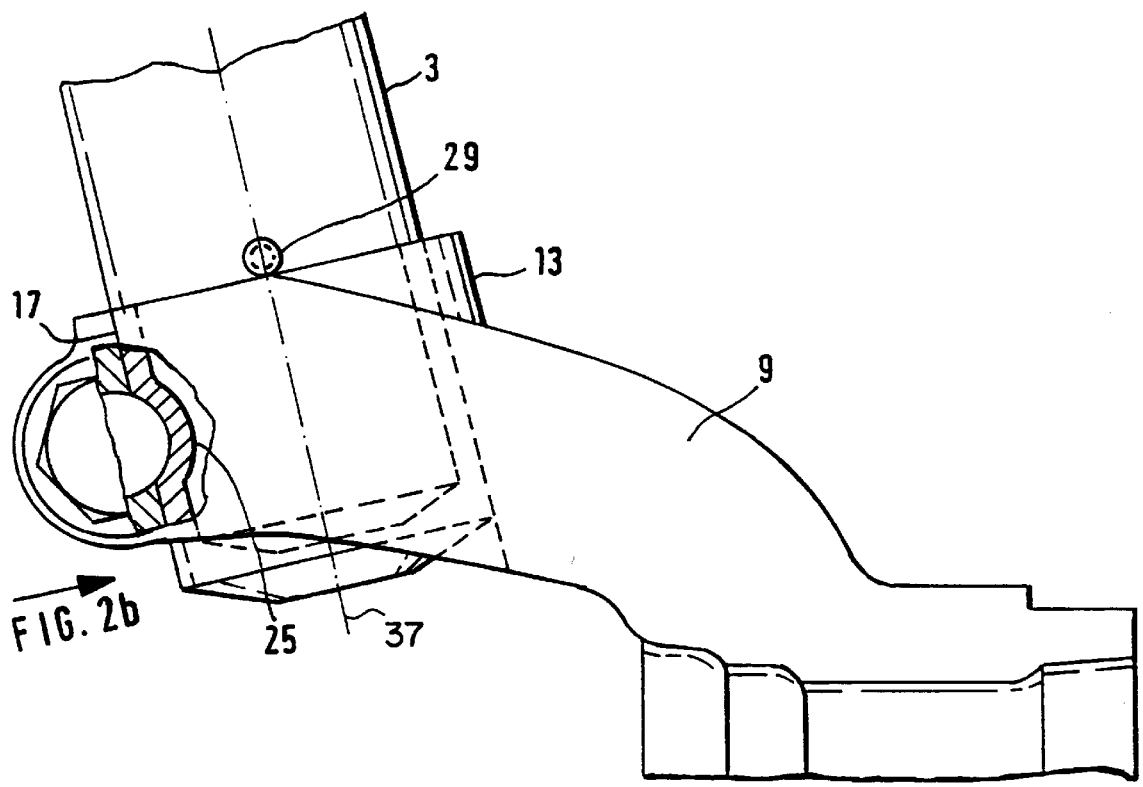
FIG. 2a is a detailed view taken along arrow 2a of FIG. 1.
Figure 2B:
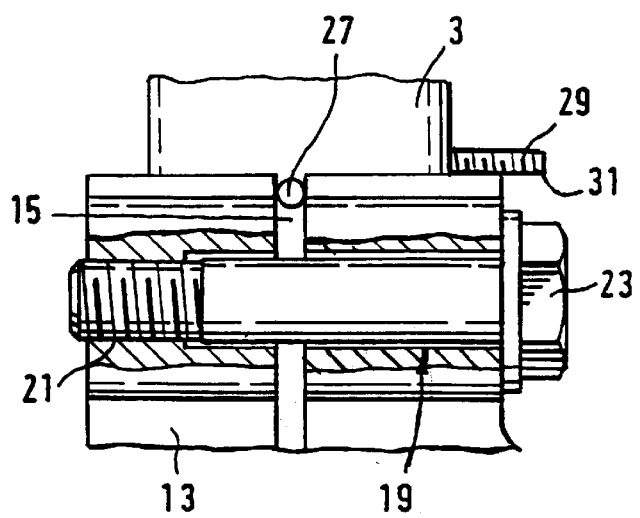

FIGS. 2a and 2b are to be viewed in conjunction. The steering knuckle 9 includes a sleeve portion 13 having a slot 15 arranged substantially parallel to the longitudinal axis 37 of the spring strut 1. The slot 15 allows the sleeve 13 to flex in the circumferential direction. A projection 17 is provided in the region of the slot 15. The projection 17 has a through-opening 19 which extends transverse to the longitudinal axis 37 of the spring strut 1. The through-opening 19 includes an internally threaded part 21. A fastener 23, such as a clamping screw, is screwed into the through-opening 19. A recess 25 is stamped into the tubular body 3 parallel to the longitudinal axis of the fastener 23, so that the fastener 23 can be fully inserted in the through-opening 19.

An engagement part 27, preferably a bolt, is arranged at the outer surface of the tubular body 3 to facilitate assembly of the steering knuckle 9 to the spring strut 1. The slot 15 engages the engagement part 27 to make a positioning connection. When the engagement part 27 is introduced into the slot 15, the through-opening 19 is aligned with the recess 25 in the circumferential direction. A stop 29 is offset relative to the engagement part 27 in the circumferential direction, the stop 29 being arranged axially above the engagement part 27 so as to provide proper axial alignment. The stop 29 projects past the sleeve portion 13. When the positioning connection is made and the sleeve portion 13 contacts the stop 29, the through-opening 19 and the recess 25 coincide.

The stop 29 is preferably another bolt. The stop bolt 29 can have a thread 31 to which a holder, not shown, especially a brake hose retainer, can be attached.

Figures 3, 4A:
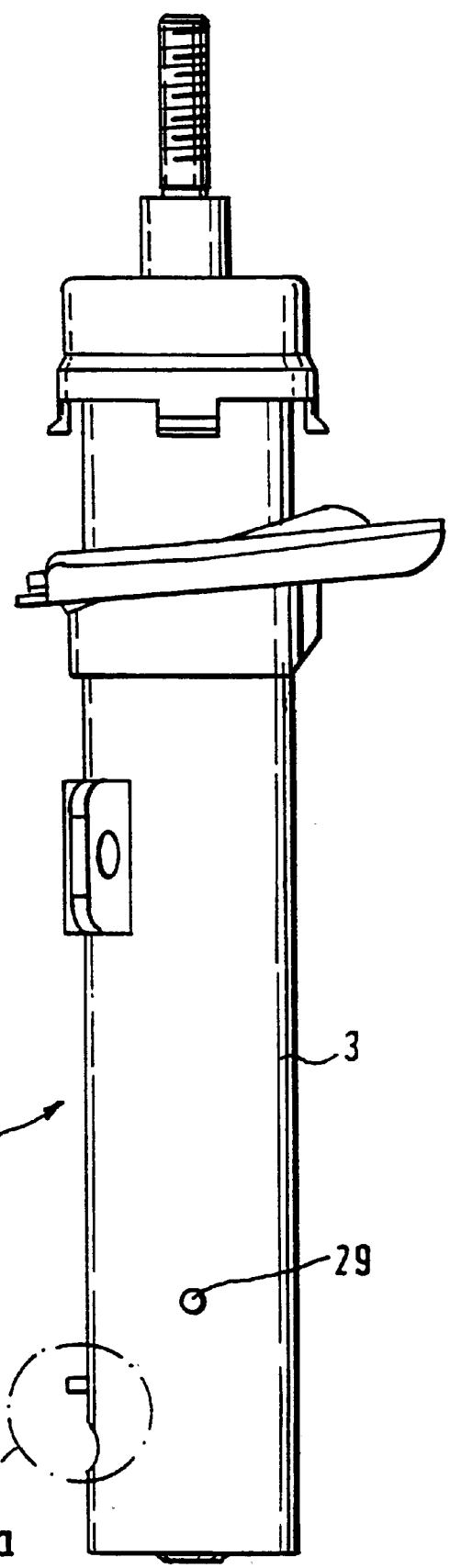
FIG. 3 is a view of the tubular body removed from the spring strut.
FIG. 4a is a detailed view of the encircled portion 4a of FIG. 3.
Figure 4A:
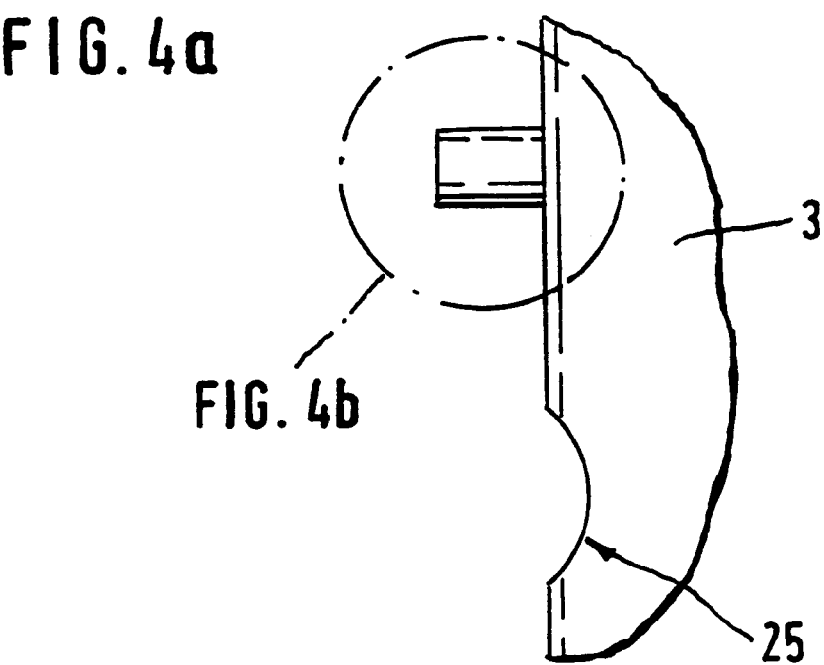
Figure 4B:
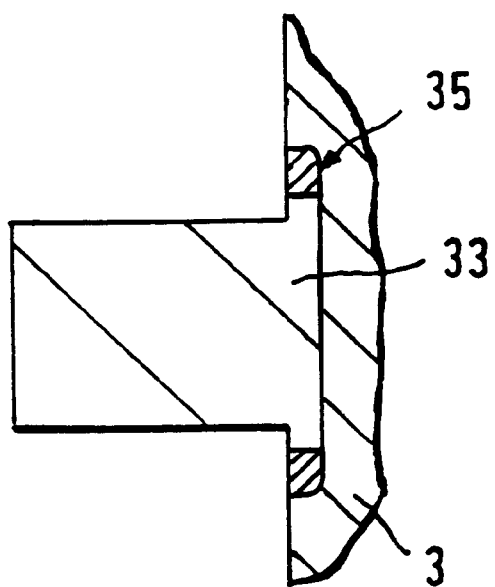

FIG. 3 shows the spring strut 1 without the steering knuckle 9. The engagement part 27 and the recess 25 are in circumferencial alignment. As can be seen in detail in FIGS. 4a and 4b, the engagement part 27 is preferably a T-shaped bolt having a head 33. A pocket 35, which is at least as deep as the height of the head 33, is stamped into the tubular body 3 at the location of the engagement part 27 so that the head 33 is countersunk in the tubular body 3. Further, the diameter of the pocket 35 is configured so as to be somewhat larger than the diameter of the head 33. Advantageously, when the engagement part 27 is welded to the tubular body 3, preferably by resistance welding, no seam area projects over the diameter of the tubular body 3, thereby preventing impairment of attachment of the steering knuckle 9.

In similar fashion, a pocket can be stamped into the tubular body 3 for attaching the stop 29. As a further advantage, the stamping device is configured so that the recess 25 and pockets 35 are produced in one work step thereby preventing alignment errors.

The invention is not limited by the embodiments described above which are presented as examples only but can be modified in various ways within the scope of protection defined by the appended patent claims.

We claim:

1. A combination comprising:

a spring strut having a tubular body;

a steering knuckle fastened to the tubular body and having a continuous slot;

screw connection means for fastening the steering knuckle to the tubular body, the screw connection means including a fastening screw, the continuous slot and the fastening screw forming a clamping connection for releasably attaching the steering knuckle to the tubular body; and positioning connection means between the tubular body and the steering knuckle for placing the slot and the fastening screw of the clamping connection in circumferential alignment, the positioning connection means including a recess arranged at an outer surface of the steering knuckle and a radially projecting first bolt arranged at an outer surface of the tubular body.

2. The combination according to claim 1, wherein the first bolt is welded to the tubular body.

3. The combination according to claim 1, wherein the first bolt has a T-shaped cross section.

4. The combination according to claim 1, wherein the first bolt has a head having a thickness and the tubular body has a pocket configured therein, with a depth at least as great as the thickness of the head of the first bolt.

5. The combination according to claim 1, further comprising a stop arranged on the tubular body so as to position the steering knuckle along a longitudinal axis of the spring strut.

6. The combination according to claim 5, wherein the stop is a second bolt.

7. The combination according to claim 6, wherein at least one of the first bolt and the second bolt has a threaded portion arranged so as to be positively connectable with another structural component part.

\* \* \* \* \*